(12) United States Patent
Naito

(10) Patent No.: US 9,905,877 B2
(45) Date of Patent: Feb. 27, 2018

(54) FUEL CELL STACK

(71) Applicant: HONDA MOTOR CO., LTD., Tokyo (JP)

(72) Inventor: Hideharu Naito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 216 days.

(21) Appl. No.: 14/667,609

(22) Filed: Mar. 24, 2015

(65) Prior Publication Data

US 2015/0280268 A1 Oct. 1, 2015

(30) Foreign Application Priority Data

Mar. 26, 2014 (JP) .................................. 2014-063378

(51) Int. Cl.
*H01M 8/2475* (2016.01)
*H01M 8/1018* (2016.01)

(52) U.S. Cl.
CPC .. *H01M 8/2475* (2013.01); *H01M 2008/1095* (2013.01); *H01M 2250/20* (2013.01); *Y02T 90/32* (2013.01)

(58) Field of Classification Search
CPC .......................... H01M 8/2475; H01M 2250/20
See application file for complete search history.

(56) References Cited

U.S. PATENT DOCUMENTS

2005/0106446 A1* 5/2005 Sato .................. H01M 8/04029
429/414
2010/0261088 A1* 10/2010 Nishiyama ............ H01M 8/248
429/469
2014/0322626 A1 10/2014 Naito

FOREIGN PATENT DOCUMENTS

| JP | 2008-112708 | 5/2008 |
|----|-------------|--------|
| JP | 2010-251065 | 11/2010 |
| JP | 2013-179032 | 9/2013 |
| JP | 2014-071943 | 4/2014 |
| JP | 2014-096285 | 5/2014 |

OTHER PUBLICATIONS

Japanese Office Action for corresponding JP Application No. 2014-063378, dated Jan. 10, 2017 (w/ English machine translation).

* cited by examiner

*Primary Examiner* — Nicholas P D'Aniello
(74) *Attorney, Agent, or Firm* — Mori & Ward, LLP

(57) ABSTRACT

A fuel cell stack includes fuel cells, first and second rectangular end plates, and side panels. The fuel cells are stacked in a stacking direction to form a stacked fuel cells having a first end and a second end opposite to the first end in the stacking direction. The side panels are disposed between and fixed to the first and second rectangular end plates to surround the stacked fuel cells. The side panels include a first side panel and a second side panel opposite to the first side panel. The first side panel and the second side panel each have an asymmetric shape and are disposed so as to be point-symmetric to each other with respect to a fuel-cell central axis extending in the stacking direction and passing through a center of the fuel cells.

17 Claims, 6 Drawing Sheets

BACKGROUND ART

FUEL CELL STACK

CROSS-REFERENCE TO RELATED APPLICATIONS

The present application claims priority under 35 U.S.C. § 119 to Japanese Patent Application No. 2014-063378, filed Mar. 26, 2014, entitled "Fuel Cell Stack." The contents of this application are incorporated herein by reference in their entirety.

BACKGROUND

1. Field

The present disclosure relates to a fuel cell stack.

2. Description of the Related Art

For example, a solid polymer electrolyte fuel cell includes a membrane electrode assembly (MEA), in which an anode electrode is disposed on one side of an electrolyte membrane and a cathode electrode is disposed on the other side of the electrolyte membrane. The electrolyte membrane is made from a polymer ion-exchange membrane. The MEA and a pair of separators, sandwiching the MEA therebetween, constitute a power generation cell. Typically, a predetermined number of such power generation cells are stacked and used, for example, as a vehicle fuel cell stack.

Particularly when used in a vehicle, a fuel cell stack may be subjected to a shock, vibration, an external load, and the like. Therefore, a structure in which a fuel cell stack is disposed in a box is used in order to provide rigidity to the entirety of the fuel cell stack. As an example of this type of structure, Japanese Unexamined Patent Application Publication No. 2008-112708 describes a fuel cell stack fastening structure.

As illustrated in FIG. 6, in this fastening structure, end plates 2b and 2a are closely attached to upper and lower end surfaces of a separator 1. A pair of angular-U-shaped enclosure panels 3a and 3b, which are detachable, cover four of the peripheral surfaces of the separator 1, except for the upper and lower end surfaces. In the detachable fastening structure, recesses, which are formed concavely along peripheral side surfaces of the end plates 2a and 2b, and projections, which are formed on upper and lower edge portions of the enclosure panels 3a and 3b, are fitted to each other.

SUMMARY

According to one aspect of the present invention, a fuel cell stack includes a plurality of fuel cells, a pair of rectangular end plates, and side panels. The plurality of fuel cells are stacked. Each of the fuel cells generates electric power by an electrochemical reaction between a fuel gas and an oxidant gas. The pair of rectangular end plates is disposed at both ends in a stacking direction of the fuel cells. The side panels are disposed between the pair of end plates and fixed to respective sides of the end plates. The side panels include a first side panel and a second side panel that are disposed at opposite positions. The first side panel and the second side panel each have an asymmetric shape and are disposed so as to be point-symmetric to each other about a fuel-cell central axis extending in the stacking direction.

According to another aspect of the present invention, a fuel cell stack includes fuel cells, first and second rectangular end plates, and side panels. The fuel cells is to generate electric power via an electrochemical reaction between a fuel gas and an oxidant gas. The fuel cells are stacked in a stacking direction to form a stacked fuel cells having a first end and a second end opposite to the first end in the stacking direction. The first and second rectangular end plates are disposed at the first and second ends, respectively. The side panels are disposed between and fixed to the first and second rectangular end plates to surround the stacked fuel cells. The side panels include a first side panel and a second side panel opposite to the first side panel. The first side panel and the second side panel each have an asymmetric shape and are disposed so as to be point-symmetric to each other with respect to a fuel-cell central axis extending in the stacking direction and passing through a center of the fuel cells.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
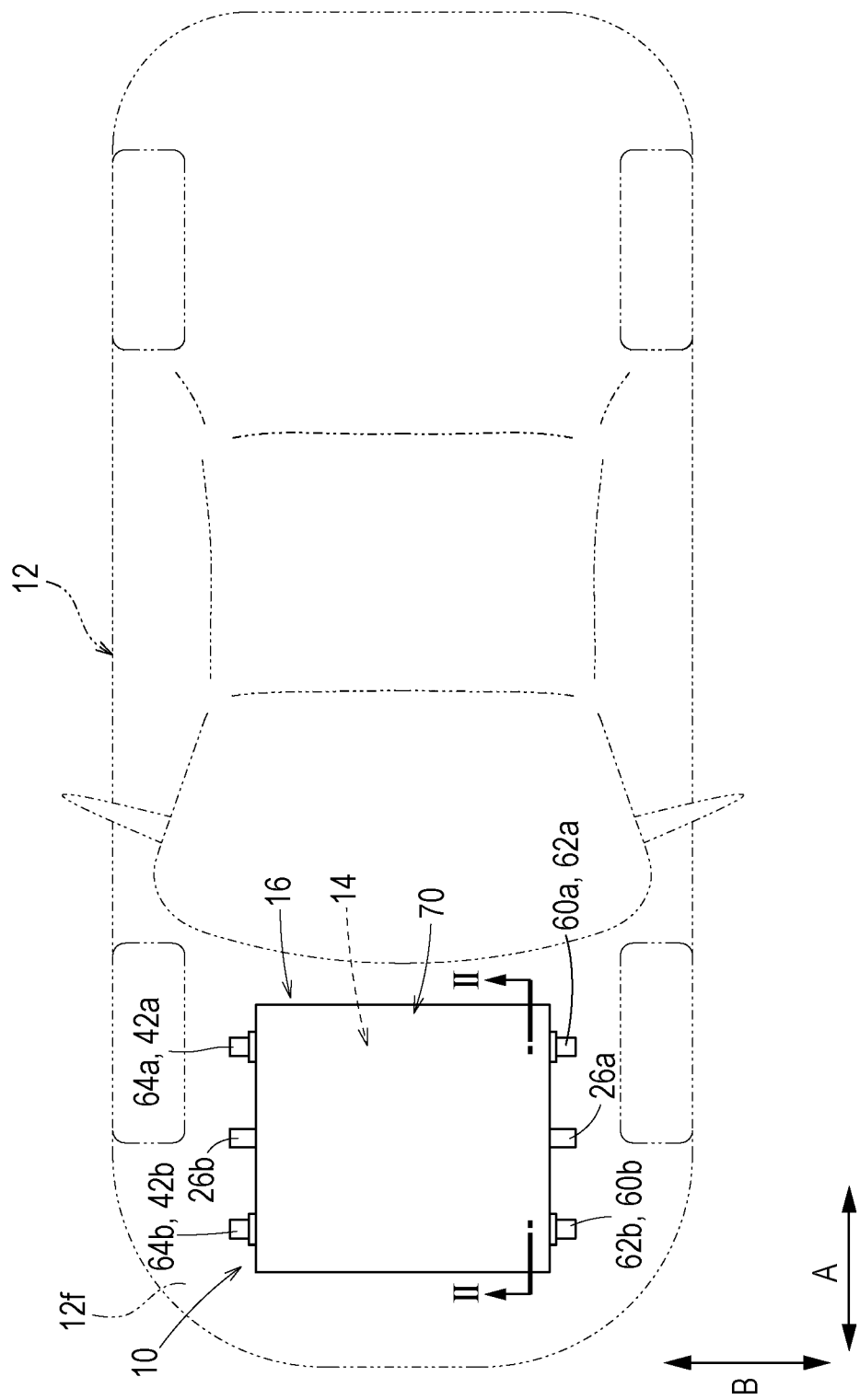
FIG. 1 is a schematic plan view of a fuel cell electric automobile in which a fuel cell stack according to a first embodiment of the present disclosure is mounted.

The embodiments will now be described with reference to the accompanying drawings, wherein like reference numerals designate corresponding or identical elements throughout the various drawings.

As illustrated in FIG. 1, a fuel cell stack 10 according to a first embodiment is disposed, for example, in a front box 12f (so-called motor room) of a fuel cell electric automobile 12 (fuel cell vehicle). Note that the fuel cell stack 10 need not be disposed in the front box 12f. Alternatively, for example, the fuel cell stack 10 may be disposed under a central part of the floor of the vehicle or near a rear trunk.

Figure 2:
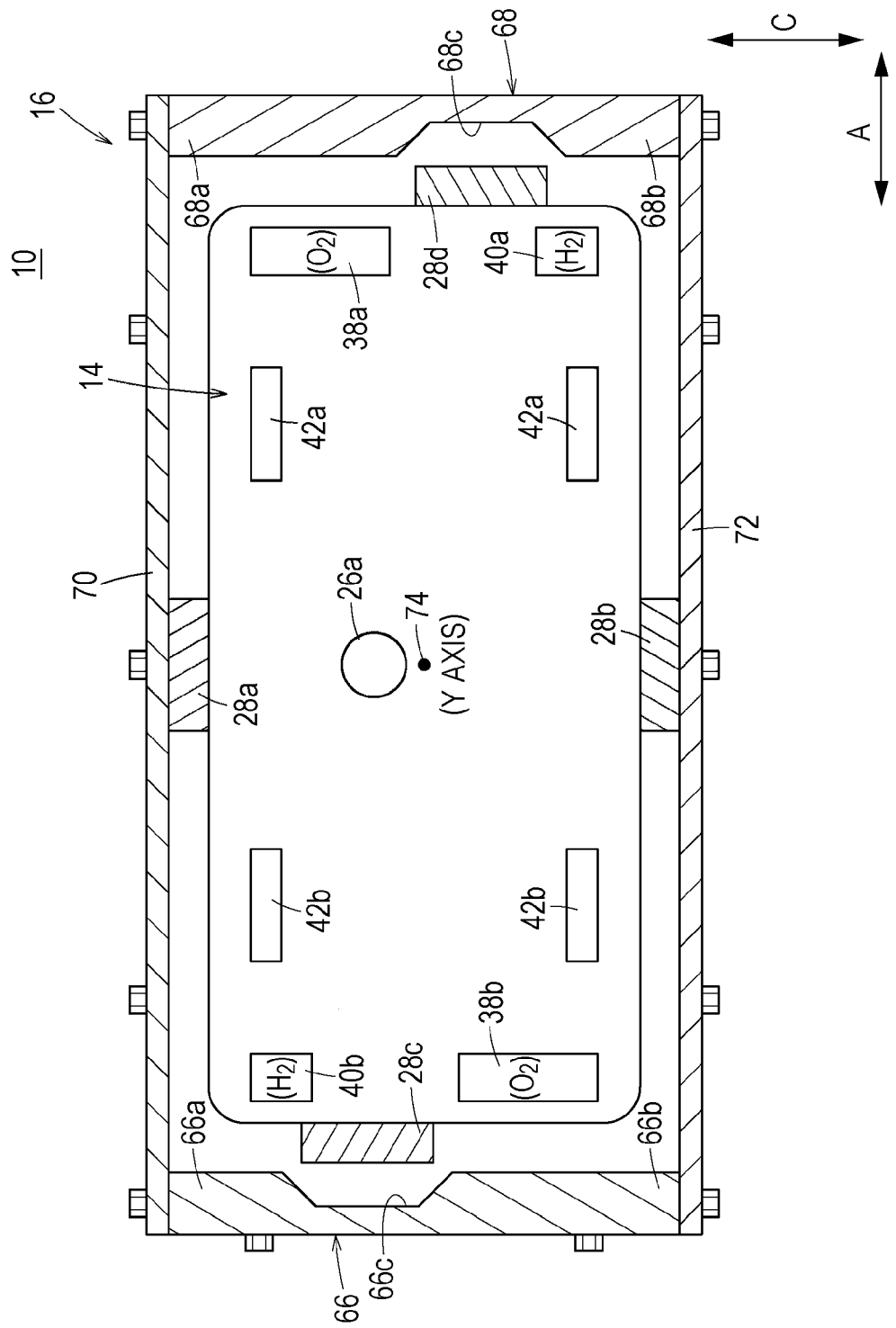
FIG. 2 is a cross-sectional view of the fuel cell stack taken along line II-II of FIG. 1.
Figure 3:
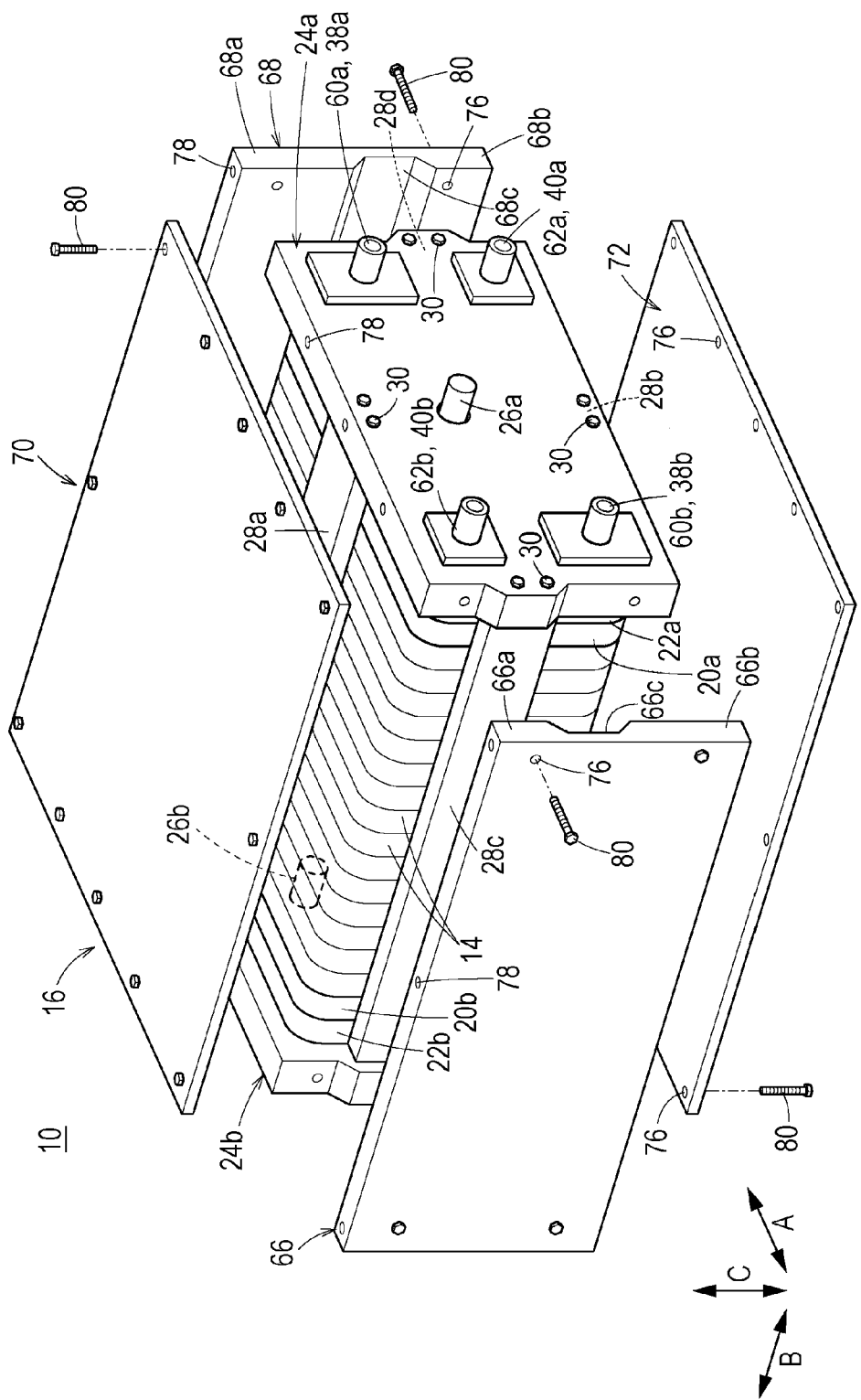
FIG. 3 is a partially exploded perspective view of the fuel cell stack.

The fuel cell stack 10 includes a plurality of fuel cells 14 that are stacked and a casing 16 in which the fuel cells 14 are disposed (see FIGS. 1 to 3). As illustrated in FIG. 3, the fuel cells 14, each in an upright position, are stacked in the vehicle-width direction (the direction of arrow B), which crosses the vehicle-length direction (the vehicle travelling direction) (the direction of arrow A) of the fuel cell electric automobile 12.

At one end of the stack of the fuel cells 14 in the stacking direction, a first terminal plate 20a, a first insulation plate 22a, and a first end plate 24a are arranged outward in this order. At the other end of the stack of the fuel cells 14 in the stacking direction, a second terminal plate 20b, a second insulation plate 22b, and a second end plate 24b are arranged outward in this order.

The first end plate 24a has a laterally elongated (rectangular) shape. A first electric power output terminal 26a, which is connected to the first terminal plate 20a, extends outward from a substantially central part (which may be displaced from the center) of the first end plate 24a. The second end plate 24*b* has a laterally elongated (rectangular) shape. A second electric power output terminal 26*b*, which is connected to the second terminal plate 20*b*, extends outward from a substantially central part of the second end plate 24*b*.

As illustrated in FIGS. 2 and 3, a connection bar 28*a*, having a predetermined length, is disposed between a substantially central part of an upper side of the first end plate 24*a* and a substantially central part of an upper side of the second end plate 24*b*. A connection bar 28*b*, having a predetermined length, is disposed between a substantially central part of a lower side of the first end plate 24*a* and a substantially central part of a lower side of the second end plate 24*b*.

A connection bar 28*c*, having a predetermined length, is disposed between a part of one of short sides of the first end plate 24*a* above the center of the short side and a part of one of short sides of the second end plate 24*b* above the center of the short side. A connection bar 28*d*, having a predetermined length, is disposed between a part of the other short side of the first end plate 24*a* below the center of the short side and a part of the other short side of the second end plate 24*b* below the center of the short side. The connection bar 28*c* is disposed between a fuel gas outlet manifold 40*b* and an oxidant gas outlet manifold 38*b*, which will be described below. The connection bar 28*d* is disposed between a fuel gas inlet manifold 40*a* and an oxidant gas inlet manifold 38*a*, which will be described below.

Both ends of each of the connection bar 28*a*, 28*b*, 28*c*, and 28*d* are fixed to the first end plate 24*a* and the second end plate 24*b* by using screws 30, thereby applying a fastening load to the stack of the fuel cells 14 in the stacking direction (direction of arrow B).

Figure 4:
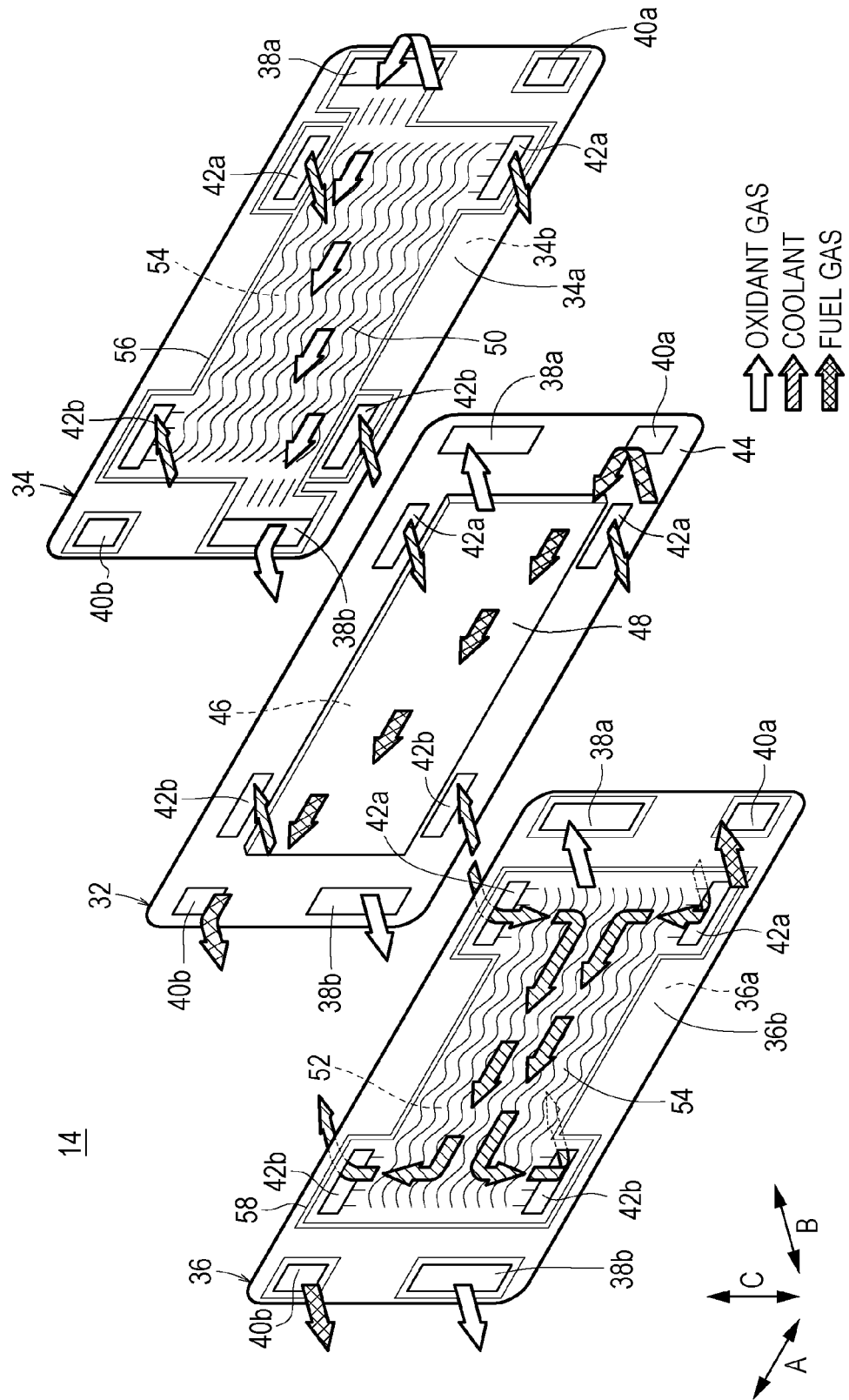
FIG. 4 is an exploded perspective view of a fuel cell included in the fuel cell stack.

As illustrated in FIG. 4, each of the fuel cells 14 includes a membrane electrode assembly 32, and a cathode separator 34 and an anode separator 36 sandwiching the membrane electrode assembly 32 therebetween.

Each of the cathode separator 34 and the anode separator 36 is made from, for example, a steel plate, a stainless steel plate, an aluminum plate, a galvanized steel plate, or any of such metal plates whose surface is anticorrosive treated. Each of the cathode separator 34 and the anode separator 36, which is made by press-forming a thin metal plate, has a rectangular shape in plan view and an undulating shape in a cross-sectional view. Instead of the metal separators, carbon separators may be used as the cathode separator 34 and the anode separator 36.

Each of the cathode separator 34 and the anode separator 36 has a laterally elongated shape having a long side extending in a horizontal direction (direction of arrow A) and a short side extending in the direction of gravity (direction of arrow C). Alternatively, each of the cathode separator 34 and the anode separator 36 may be disposed so that a short side thereof extends in the horizontal direction and a long side thereof extends in the direction of gravity.

The oxidant gas inlet manifold 38*a* and the fuel gas inlet manifold 40*a* are formed in the fuel cell 14 so as to extend in the direction of arrow B respectively through an upper part and a lower part of one end portion of the fuel cell 14 in the longitudinal direction (direction of arrow A). An oxidant gas, such as an oxygen-containing gas, is supplied through the oxidant gas inlet manifold 38*a*. A fuel gas, such as a hydrogen-containing gas, is supplied through the fuel gas inlet manifold 40*a*. The opening area (for example, the length of the opening in the direction of arrow C) of the oxidant gas inlet manifold 38*a* is larger than the opening area (for example, the length of the opening in the direction of arrow C) of the fuel gas inlet manifold 40*a*.

The fuel gas outlet manifold 40*b* and the oxidant gas outlet manifold 38*b* are formed in the fuel cell 14 so as to extend in the direction of arrow B respectively through an upper part and a lower part of the other end portion of the fuel cell 14 in the longitudinal direction. The fuel gas is discharged through the fuel gas outlet manifold 40*b*. The oxidant gas is discharged through the oxidant gas outlet manifold 38*b*. The opening area (for example, the length of the opening in the direction of arrow C) of the oxidant gas outlet manifold 38*b* is larger than the opening area (for example, the length of the opening in the direction of arrow C) of the fuel gas outlet manifold 40*b*.

A pair of coolant inlet manifolds 42*a* are formed in the fuel cell 14 so as to extend in the direction of arrow B through end portions of the fuel cell 14 in the transversal direction (direction of arrow C) on one side of the fuel cell 14, that is, on a side adjacent to the oxidant gas inlet manifold 38*a* and the fuel gas inlet manifold 40*a*. The pair of coolant inlet manifolds 42*a*, through which a coolant is supplied, are disposed at opposite end portions.

A pair of coolant outlet manifolds 42*b* are formed in the fuel cell 14 so as to extend in the direction of arrow B through end portions of the fuel cell 14 in the transversal direction on the other side of the fuel cell 14, that is, on a side adjacent to the fuel gas outlet manifold 40*b* and the oxidant gas outlet manifold 38*b*. The pair of coolant outlet manifolds 42*b*, through which a coolant is discharged, are disposed at opposite end portions.

The membrane electrode assembly 32 includes a solid polymer electrolyte membrane 44 (cation exchange membrane), and a cathode electrode 46 and an anode electrode 48 sandwiching the solid polymer electrolyte membrane 44 therebetween. The solid polymer electrolyte membrane 44 is, for example, a thin film that is made of perfluorosulfonic acid copolymers and impregnated with water.

The cathode electrode 46 and the anode electrode 48 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are disposed, for example, on both sides of the solid polymer electrolyte membrane 44.

An oxidant gas channel 50, through which the oxidant gas inlet manifold 38*a* is connected to the oxidant gas outlet manifold 38*b*, is formed on a surface 34*a* of the cathode separator 34 facing the membrane electrode assembly 32. The oxidant gas channel 50 includes a plurality of wave-shaped channel grooves (or linear channel grooves) extending in the direction of arrow A.

A fuel gas channel 52, through which the fuel gas inlet manifold 40*a* is connected to the fuel gas outlet manifold 40*b*, is formed on a surface 36*a* of the anode separator 36 facing the membrane electrode assembly 32. The fuel gas channel 52 includes a plurality of wave-shaped channel grooves (or linear channel grooves) extending in the direction of arrow A.

A coolant channel 54, through which the coolant inlet manifolds 42*a* are connected to the coolant outlet manifolds 42*b*, is formed between a surface 36*b* of the anode separator 36 of the fuel cell 14 and a surface 34*b* of the cathode separator 34 of an adjacent fuel cell 14. The coolant channel 54 allows the coolant to flow over the regions of the surfaces 36b and 34b corresponding to the electrodes of the membrane electrode assembly 32.

A first sealing member 56 is integrally formed on the surfaces 34a and 34b of the cathode separator 34 so as to surround the outer periphery of the cathode separator 34. A second sealing member 58 is integrally formed on the surfaces 36a and 36b of the anode separator 36 so as to surround the outer periphery of the anode separator 36.

Each of the first sealing member 56 and the second sealing member 58 is made from an elastic material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

As illustrated in FIG. 3, an external oxidant gas supply manifold 60a, an external oxidant gas discharge manifold 60b, an external fuel gas supply manifold 62a, and an external fuel gas discharge manifold 62b are attached to the first end plate 24a. The external oxidant gas supply manifold 60a and the external oxidant gas discharge manifold 60b are respectively connected to the oxidant gas inlet manifold 38a and the oxidant gas outlet manifold 38b. The external fuel gas supply manifold 62a and the external fuel gas discharge manifold 62b are respectively connected to the fuel gas inlet manifold 40a and the fuel gas outlet manifold 40b.

As illustrated in FIG. 1, an external coolant supply manifold 64a and an external coolant discharge manifold 64b, which are respectively connected to the pair of coolant inlet manifolds 42a and the pair of coolant outlet manifolds 42b, are attached to the second end plate 24b.

As illustrated in FIG. 3, the casing 16 includes the first end plate 24a and the second end plate 24b, which are disposed at both ends of the casing 16 in the vehicle-width direction (direction of arrow B). As illustrated in FIGS. 2 and 3, the casing 16 includes a front side panel 66 (first side panel) and a back side panel 68 (second side panel), which are disposed at both ends of the casing 16 in the vehicle-length direction (direction of arrow A).

The casing 16 includes an upper side panel 70 and a lower side panel 72, which are disposed on two sides (surfaces) at both ends of the casing 16 in the vehicle-height direction (direction of arrow C). The front side panel 66 and the back side panel 68 are disposed at opposite positions of the casing 16, and the upper side panel 70 and the lower side panel 72 are disposed at other opposite positions of the casing 16.

The front side panel 66 is disposed in a vertically upright position and has a laterally elongated plate-like shape. The front side panel 66 includes inwardly protruding portions 66a and 66b, which protrude inward into the casing 16 and which are respectively formed in upper and lower parts thereof. A recess 66c is formed between the inwardly protruding portions 66a and 66b. The inwardly protruding portion 66a, which is disposed in the upper part of the front side panel 66, is smaller than (has a length in the direction of arrow C smaller than) that of the inwardly protruding portion 66b, which is disposed in the lower part of the front side panel 66. The front side panel 66 has an asymmetric shape. The shape of the front side panel 66 is not particularly limited, as long as the shape is asymmetric at the central position of the short side with respect to the stacking direction. For example, the front side panel 66 may have a convex shape, a concave shape, or any other appropriate shape. The same applies to the asymmetric shape described below.

The back side panel 68 is disposed in a vertically upright position and has a laterally elongated plate-like shape. The back side panel 68 includes inwardly protruding portions 68a and 68b, which protrude inward into the casing 16 and which are respectively formed in upper and lower parts thereof. A recess 68c is formed between the inwardly protruding portions 68a and 68b. The inwardly protruding portion 68a, which is disposed in the upper part of the back side panel 68, is larger than (has a length in the direction of arrow C larger than) that of the inwardly protruding portion 68b, which is disposed in the lower part of the back side panel 68. The back side panel 68 has an asymmetric shape.

As illustrated in FIG. 2, the front side panel 66 and the back side panel 68 are disposed so as to be point-symmetric to each other about a fuel-cell central axis 74 (Y axis), which extends in the stacking direction of the fuel cells 14 and which is located at the center of the short side and at the center of the long side of each of the first end plate 24a and the second end plate 24b. The front side panel 66 has the same shape as the back side panel 68 if the front side panel 66 is rotated by 180 degrees around the fuel-cell central axis 74. To be specific, the inwardly protruding portion 66a of the front side panel 66 coincides with the inwardly protruding portion 68b of the back side panel 68, and the inwardly protruding portion 66b of the front side panel 66 coincides with the inwardly protruding portion 68a of the back side panel 68.

Each of the upper side panel 70 and the lower side panel 72 is a flat plate (or a stack of plates). Bolt-insertion holes 76 are formed at appropriate positions in the front side panel 66, the back side panel 68, the upper side panel 70, and the lower side panel 72.

Screw holes 78 are formed at appropriate positions in the first end plate 24a, the second end plate 24b, the front side panel 66, and the back side panel 68. The upper side panel 70, the lower side panel 72, the front side panel 66, and the back side panel 68 are fixed to the first end plate 24a and the second end plate 24b by inserting screws 80 into the bolt-insertion holes 76 and screwing the screws 80 into the screw holes 78.

The operation of the fuel cell stack 10 having the aforementioned structure will be described.

Referring FIG. 3, first, an oxidant gas, such as an oxygen-containing gas, is supplied to the oxidant gas inlet manifold 38a from the external oxidant gas supply manifold 60a on the first end plate 24a. A fuel gas, such as a hydrogen-containing gas, is supplied to the fuel gas inlet manifold 40a from the external fuel gas supply manifold 62a on the first end plate 24a. Referring to FIG. 1, a coolant, such as pure water, ethylene glycol, or an oil, is supplied to the pair of coolant inlet manifolds 42a from the external coolant supply manifold 64a on the second end plate 24b.

As illustrated in FIG. 4, the oxidant gas is introduced from the oxidant gas inlet manifold 38a into the oxidant gas channel 50 of the cathode separator 34. The oxidant gas flows along the oxidant gas channel 50 in the direction of arrow A, and is supplied to the cathode electrode 46 of the membrane electrode assembly 32.

The fuel gas is supplied from the fuel gas inlet manifold 40a to the fuel gas channel 52 of the anode separator 36. The fuel gas flows along the fuel gas channel 52 in the direction of arrow A, and is supplied to the anode electrode 48 of the membrane electrode assembly 32.

Accordingly, in the membrane electrode assembly 32, the oxidant gas supplied to the cathode electrode 46 and the fuel gas supplied to the anode electrode 48 are consumed in electrochemical reactions in the electrode catalyst layers, thus generating electric power.

Next, the oxidant gas, which has been supplied to the cathode electrode 46 of the membrane electrode assembly 32 and consumed, is discharged along the oxidant gas outlet manifold 38b in the direction of arrow B. The fuel gas, which has been supplied to the anode electrode 48 of the membrane electrode assembly 32 and consumed, is discharged along the fuel gas outlet manifold 40b in the direction of arrow B.

The coolant, which has been supplied to the pair of coolant inlet manifolds 42a, is introduced into the coolant channel 54 between the cathode separator 34 and the anode separator 36. The coolant temporarily flows inward in the direction of arrow C, then flows in the direction of arrow A, and cools the membrane electrode assembly 32. The coolant flows outward in the direction of arrow C, and is discharged along the pair of coolant outlet manifolds 42b in the direction of arrow B.

In the first embodiment, as illustrated in FIGS. 2 and 3, the front side panel 66 includes the inwardly protruding portion 66a and the inwardly protruding portion 66b, whose dimensions differ from each other; and the front side panel 66 has an asymmetric shape. The back side panel 68 includes the inwardly protruding portion 68a and the inwardly protruding portion 68b, whose dimensions differ from each other; and the back side panel 68 has an asymmetric shape. The front side panel 66 and the back side panel 68 are disposed so as to be point-symmetric to each other about the fuel-cell central axis 74.

Therefore, for example, the front side panel 66 has the same shape as the back side panel 68 if the front side panel 66 is rotated by 180 degrees around the fuel-cell central axis 74. Accordingly, by preparing only two side panels of the same type, one of the side panels can be used as the front side panel 66, and the other side panel can be used as the back side panel 68 by inverting the other side panel.

Thus, the front side panel 66 and the back side panel 68, each of which is asymmetric, can be manufactured by using the same casting die, the same forging die, and the like. Therefore, an advantage can be obtained in that the fuel cells 14 can be effectively protected by using an economical structure.

In the first embodiment, the front side panel 66 may include two or more inwardly protruding portions 66a and two or more inwardly protruding portions 66b. Alternatively, the front side panel 66 may include a recessed portion or an outwardly protruding portion. The back side panel 68 may be modified in the same way as the front side panel 66 as described above. Further alternatively, the present disclosure may be applied to the upper side panel 70 and the lower side panel 72.

Figure 5:
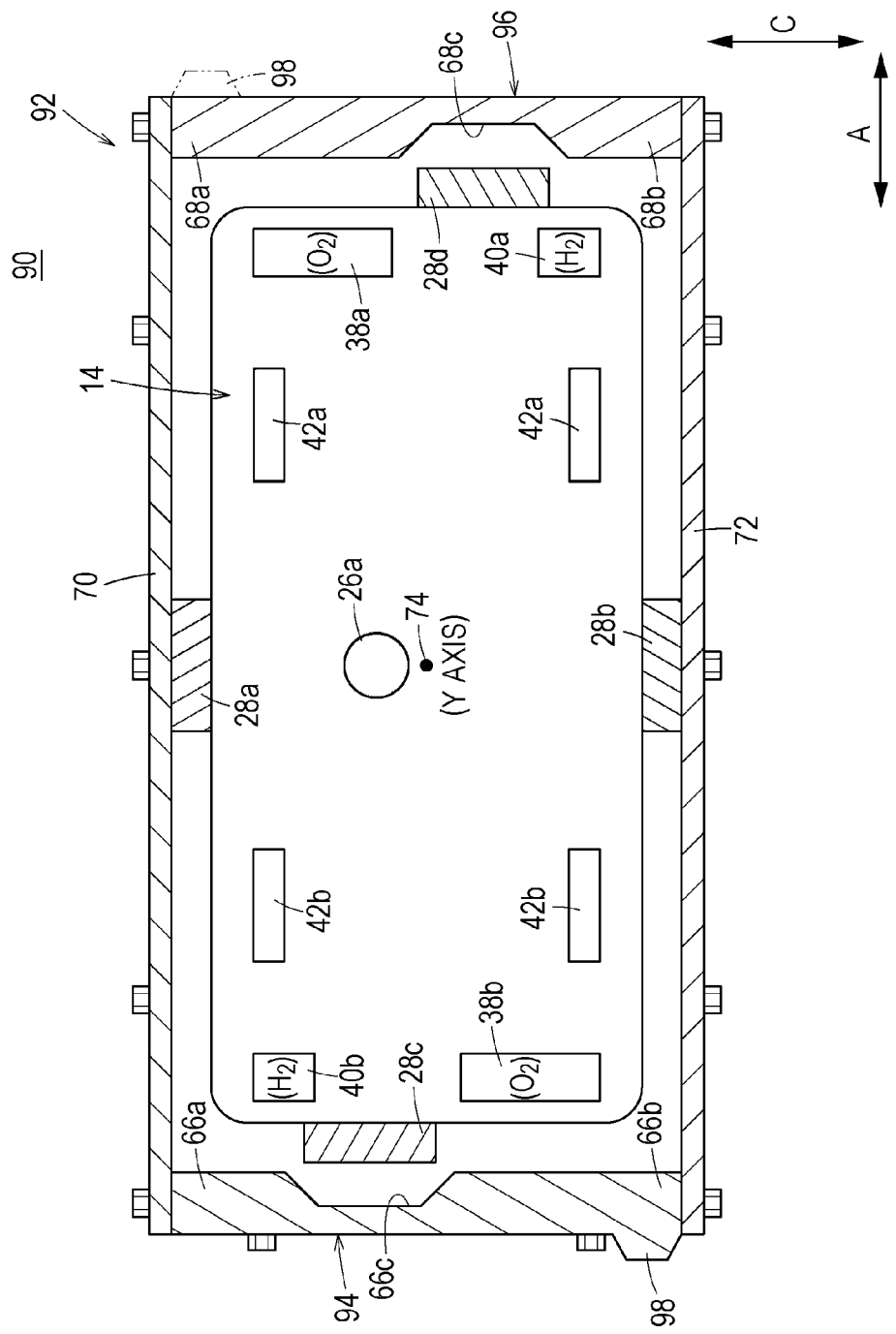
FIG. 5 is a cross-sectional view of a fuel cell stack according to a second embodiment of the present disclosure.
Figure 6:
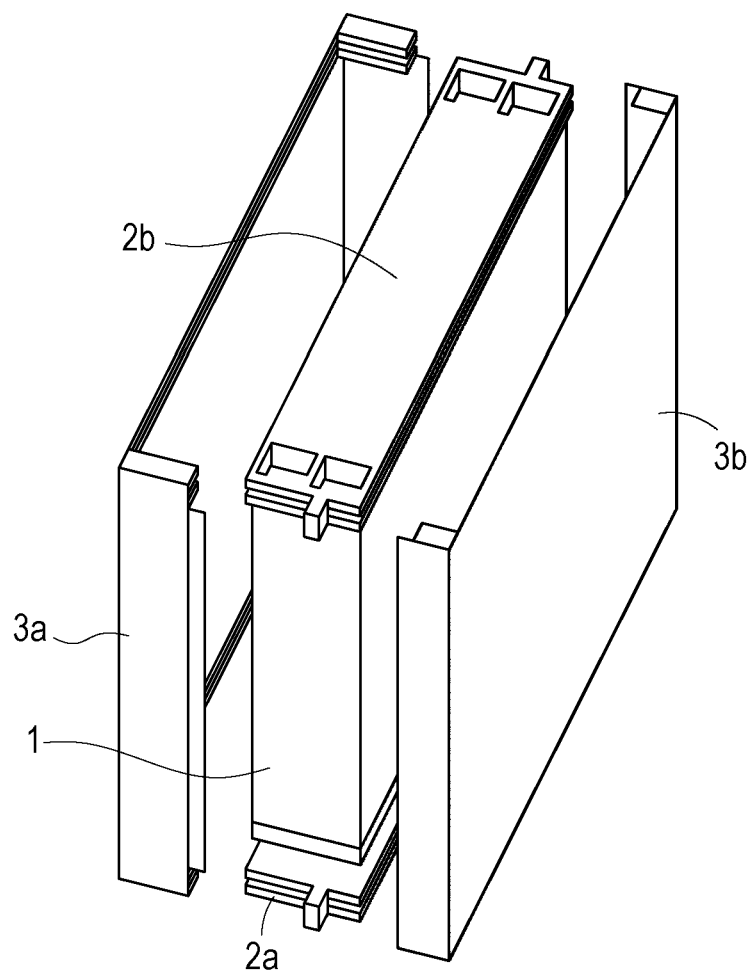
FIG. 6 is a perspective view of a fastening structure of a fuel cell stack of the related art.

FIG. 5 is a cross-sectional view of a fuel cell stack 90 according to a second embodiment of the present disclosure. Elements of the fuel cell stack 90 that are the same as those of the fuel cell stack 10 will denoted by the same numerals and detailed descriptions of such elements will be omitted.

The fuel cell stack 90 includes a casing 92. The casing 92 includes a front side panel 94 (first side panel) and a back side panel 96 (second side panel), which are disposed on two sides (surfaces) at both ends of the casing 92 in the vehicle-length direction (direction of arrow A).

A boss 98, which extends in the stacking direction (longitudinal direction), is formed on a lower end portion of the front side panel 94. The boss 98 is used, for example, to fix a harness (not shown) in place. The back side panel 96 need not have the boss 98. Therefore, the boss 98 is removed from the back side panel 96 in post-processing, so that the final product does not have the boss 98 on the back side panel 96.

According to the second embodiment, by preparing two front side panels 94, and by inverting one of the front side panels 94 and removing the boss 98 from the front side panel 94, the front side panel 94 can be used as the back side panel 96. Thus, an advantage the same as that of the first embodiment, such as effective protection of the fuel cells 14 by using an economical structure, can be obtained.

The present application describes a fuel cell stack including a plurality of fuel cells that are stacked, each of the fuel cells generating electric power by an electrochemical reaction between a fuel gas and an oxidant gas; a pair of rectangular end plates disposed at both ends in a stacking direction of the fuel cells; and side panels disposed between the pair of end plates and fixed to respective sides of the end plates.

The side panels include a first side panel and a second side panel that are disposed at opposite positions. The first side panel and the second side panel each have an asymmetric shape and are disposed so as to be point-symmetric to each other about a fuel-cell central axis extending in the stacking direction.

Preferably, the fuel cells each have a laterally elongated rectangular shape and are stacked in a horizontal direction, and the first side panel is disposed along one of short sides of each of the fuel cells, and the second side panel is disposed along the other short side of each of the fuel cells.

According to the present disclosure, the first side panel and the second side panel each have an asymmetric shape. Moreover, each one of the first side panel and the second side panel has the same shape as the other if it is rotated by 180 degrees around the fuel-cell central axis. Therefore, by preparing only two side panels of the same shape, one of the side panels can be used as the first side panel and the other side panel can be used as the second side panel by inverting the other side panel.

Accordingly, the two side panels, which are asymmetric to each other, can be used interchangeably, and the fuel cells can be effectively protected by using an economical structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
  a plurality of fuel cells that are stacked, each of the fuel cells generating electric power by an electrochemical reaction between a fuel gas and an oxidant gas;
  a pair of end plates disposed at both ends in a stacking direction of the fuel cells, each end plate of the pair of end plates longitudinally extending in a direction perpendicular to the stacking direction; and
  side panels disposed between the pair of end plates and fixed to respective sides of the end plates,
  wherein the side panels include a first side panel and a second side panel that are disposed at opposite positions,
  wherein the first side panel and the second side panel each have an asymmetric shape when viewed in the stacking direction and are disposed so as to be point-symmetric to each other about a fuel-cell central axis extending in the stacking direction, wherein each of the first side panel and the second side panel has a plate shape extending within parallel planes, and wherein the first side panel overlaps with the second side panel when viewed in a direction orthogonal to the parallel planes.

2. The fuel cell stack according to claim 1, wherein the fuel cells each have a laterally elongated rectangular shape and are stacked in a horizontal direction, and wherein the first side panel is disposed along one of short sides of each of the fuel cells, and the second side panel is disposed along the other short side of each of the fuel cells.

3. A fuel cell stack comprising:

fuel cells to generate electric power via an electrochemical reaction between a fuel gas and an oxidant gas, the fuel cells being stacked in a stacking direction to form a stacked fuel cells having a first end and a second end opposite to the first end in the stacking direction;

first and second rectangular end plates disposed at the first and second ends, respectively, each of the first and second rectangular end plates longitudinally extending in a direction perpendicular to the stacking direction; and side panels disposed between and fixed to the first and second rectangular end plates to surround the stacked fuel cells, the side panels including a first side panel and a second side panel opposite to the first side panel, the first side panel and the second side panel each having an asymmetric shape when viewed in the stacking direction and disposed so as to be point-symmetric to each other with respect to a fuel-cell central axis extending in the stacking direction and passing through a center of the fuel cells, wherein each of the first side panel and the second side panel has a plate shape extending within parallel planes, and wherein the first side panel overlaps with the second side panel when viewed in a direction orthogonal to the parallel planes.

4. The fuel cell stack according to claim 3, wherein the fuel cells each have a laterally elongated rectangular shape and are stacked in a horizontal direction, wherein each of the fuel cells has a first short side and a second short side opposite to the first short side, and wherein the first side panel is disposed along the first short side and the second side panel is disposed along the second short side.

5. The fuel cell stack according to claim 3, wherein the first side panel and the second side panel each have an elongated rectangular shape in the stacking direction, wherein a shape of the first side panel is asymmetric at a central position of a short side of the first side panel when viewed in the stacking direction, and wherein a shape of the second side panel is asymmetric at a central position of a short side of the second side panel when viewed in the stacking direction.

6. The fuel cell stack according to claim 3, wherein the first and second side panels are each disposed in a vertically upright position to sandwich the stacked fuel cells between the first and second side panels in a horizontal direction, wherein the first side panel includes a first protruding portion in an upper part of the first side panel and a second protruding portion in a lower part of the first side panel in a vertical direction, wherein the first and second protruding portions extend along the first side panel and protrude from the first side panel toward the stacked fuel cells, wherein the second side panel includes a third protruding portion in an upper part of the second side panel and a fourth protruding portion in a lower part of the second side panel in the vertical direction, and wherein the third and fourth protruding portions extend along the second side panel and protrude from the second side panel toward the stacked fuel cells.

7. The fuel cell stack according to claim 6, wherein the first protruding portion is smaller than the second protruding portion, and wherein the third protruding portion is larger than the fourth protruding portion.

8. The fuel cell stack according to claim 1, wherein the side panels are directly connected to the pair of end plates by fastening members.

9. The fuel cell stack according to claim 3, wherein the side panels are directly connected to the first and second rectangular end plates by fastening members.

10. The fuel cell stack according to claim 1, wherein only a first end plate of the pair of end plates is disposed at a first end of the ends of the stacked fuel cells in the stacking direction, and wherein only a second end plate of the pair of end plates is disposed at a second end of the ends of the stacked fuel cells in the stacking direction, the second end being located at an opposite side of the stacked fuel cells than the first end in the stacking direction.

11. The fuel cell stack according to claim 1, wherein the side panels each longitudinally extends in a direction parallel to the stacking direction.

12. The fuel cell stack according to claim 1, wherein each of the side panels has a side surface facing the fuel cells with a recess provided on the side surface.

13. The fuel cell stack according to claim 12, wherein the recess longitudinally extends in a direction parallel to the stacking direction.

14. The fuel cell stack according to claim 3, wherein only the first rectangular end plate of the first and second rectangular end plates is disposed at the first end of the stacked fuel cells in the stacking direction, and wherein only the second rectangular end plate of the first and second rectangular end plates is disposed at the second end of the stacked fuel cells in the stacking direction.

15. The fuel cell stack according to claim 3, wherein the side panels each longitudinally extends in a direction parallel to the stacking direction.

16. The fuel cell stack according to claim 3, wherein each of the side panels has a side surface facing the fuel cells with a recess provided on the side surface.

17. The fuel cell stack according to claim 16, wherein the recess longitudinally extends in a direction parallel to the stacking direction.

* * * * *